No. 824,579. PATENTED JUNE 26, 1906.
J. W. PAUL.
TYPE WRITER.
APPLICATION FILED NOV. 1, 1901.
6 SHEETS—SHEET 1.
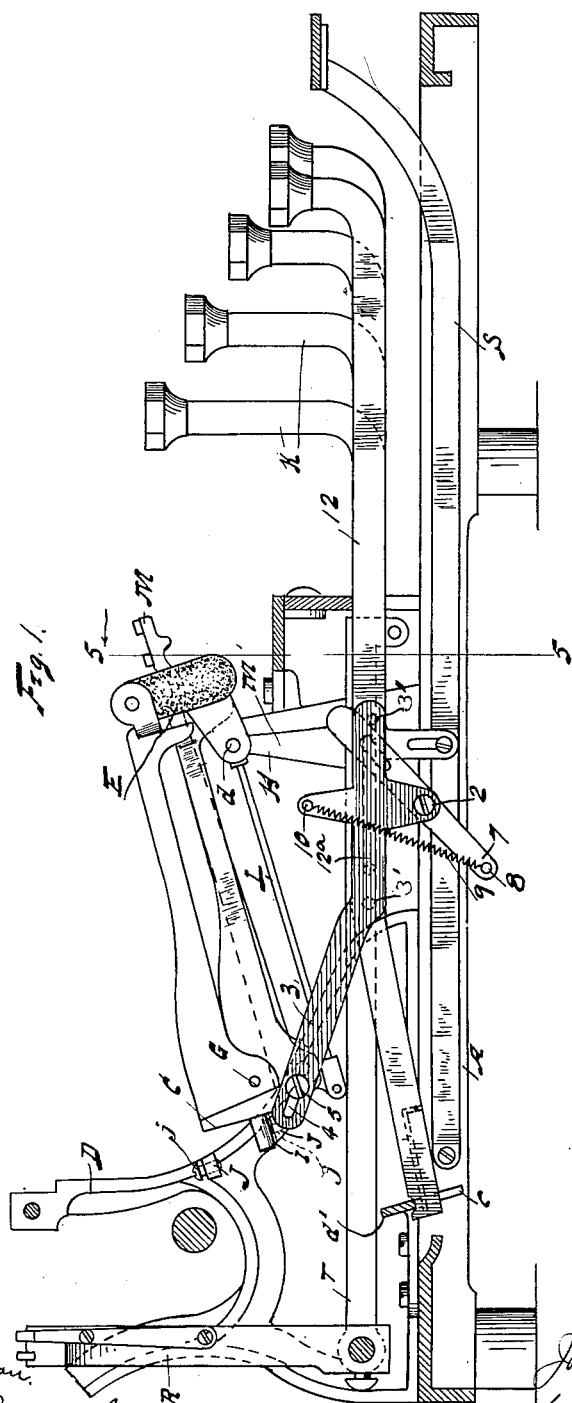

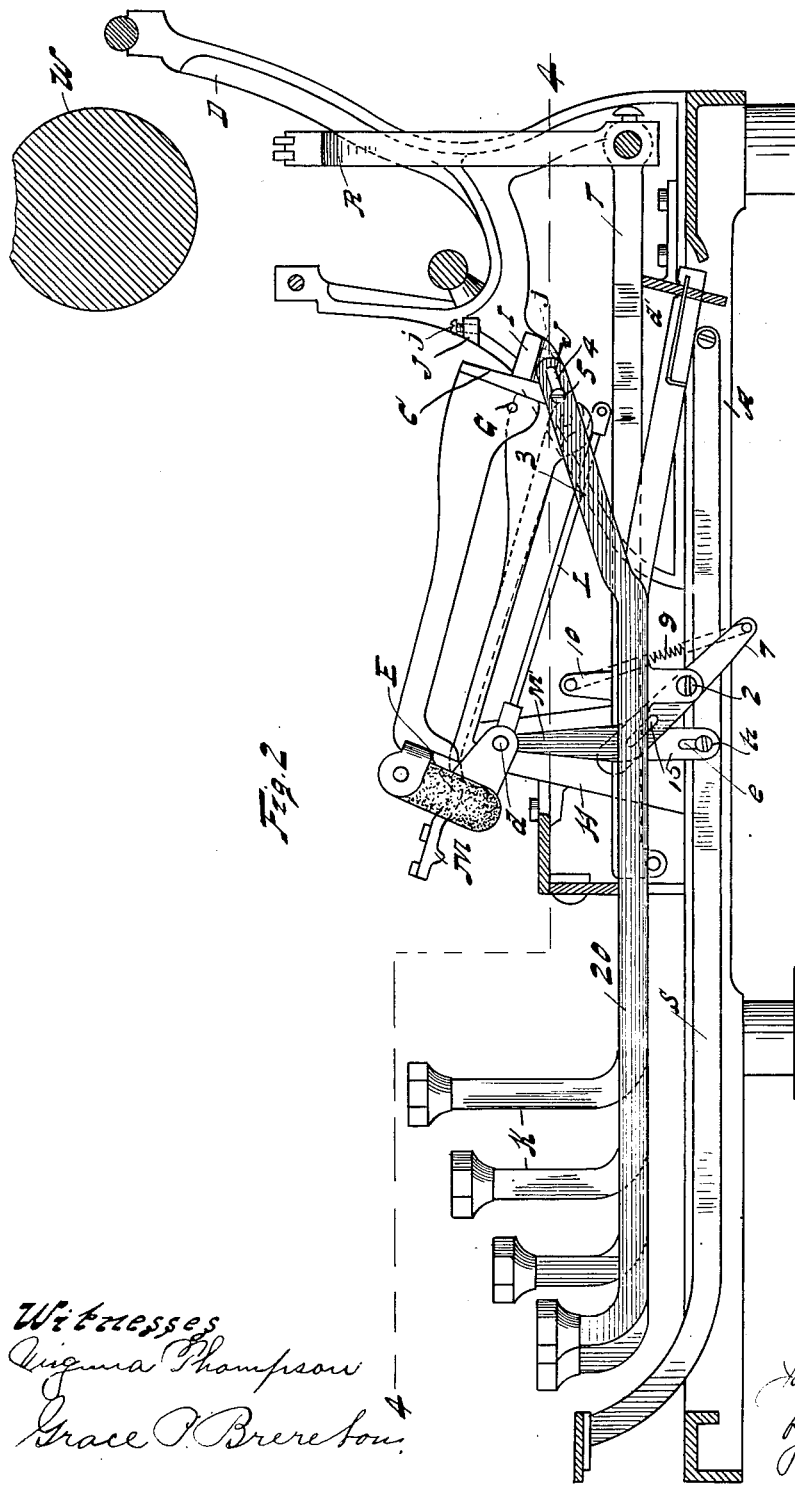

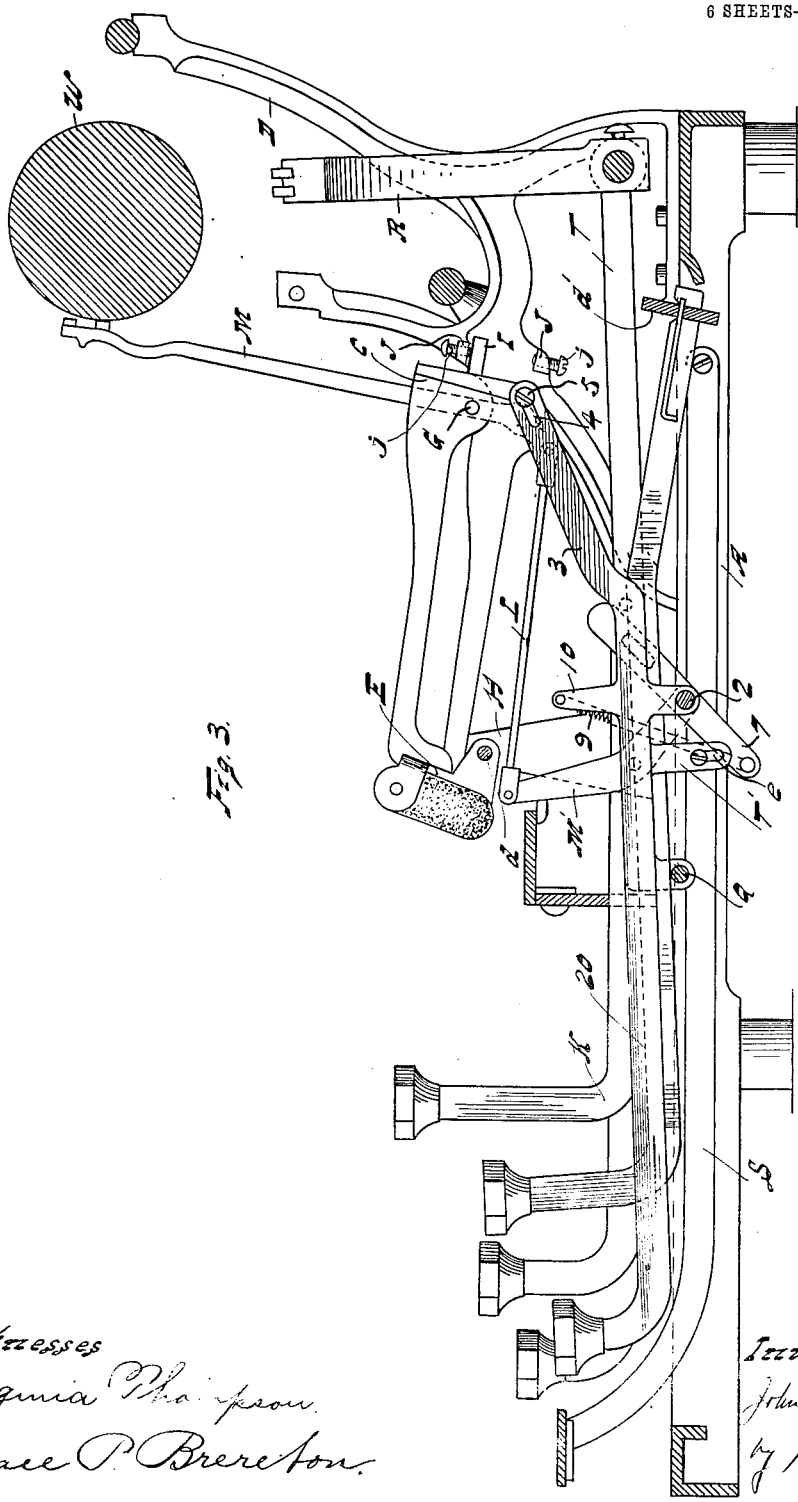

No. 824,579. PATENTED JUNE 26, 1906.
J. W. PAUL.
TYPE WRITER.
APPLICATION FILED NOV. 1, 1901.
6 SHEETS—SHEET 4.
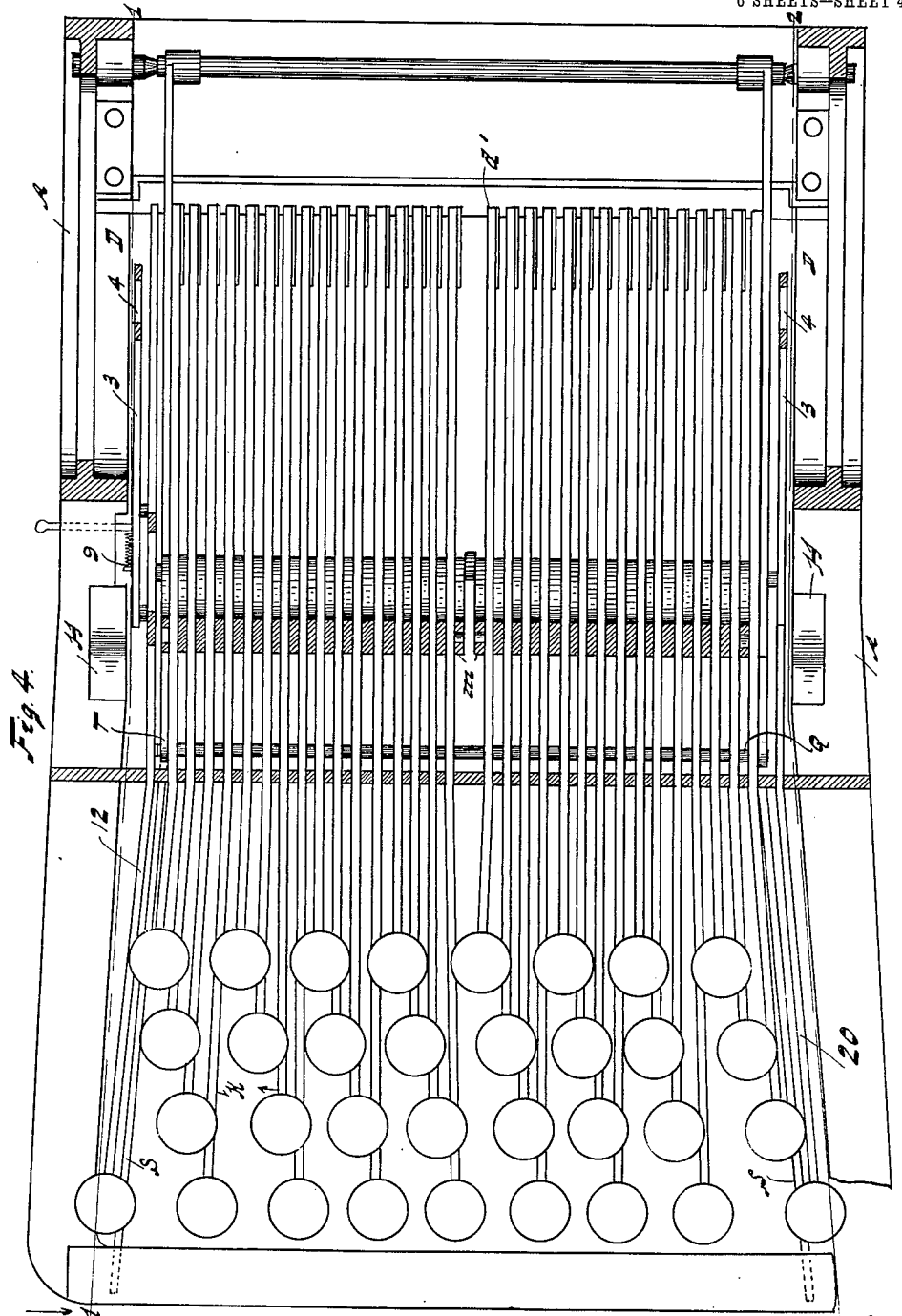

No. 824,579. PATENTED JUNE 26, 1906.
J. W. PAUL.
TYPE WRITER.
APPLICATION FILED NOV. 1, 1901.
6 SHEETS—SHEET 5.
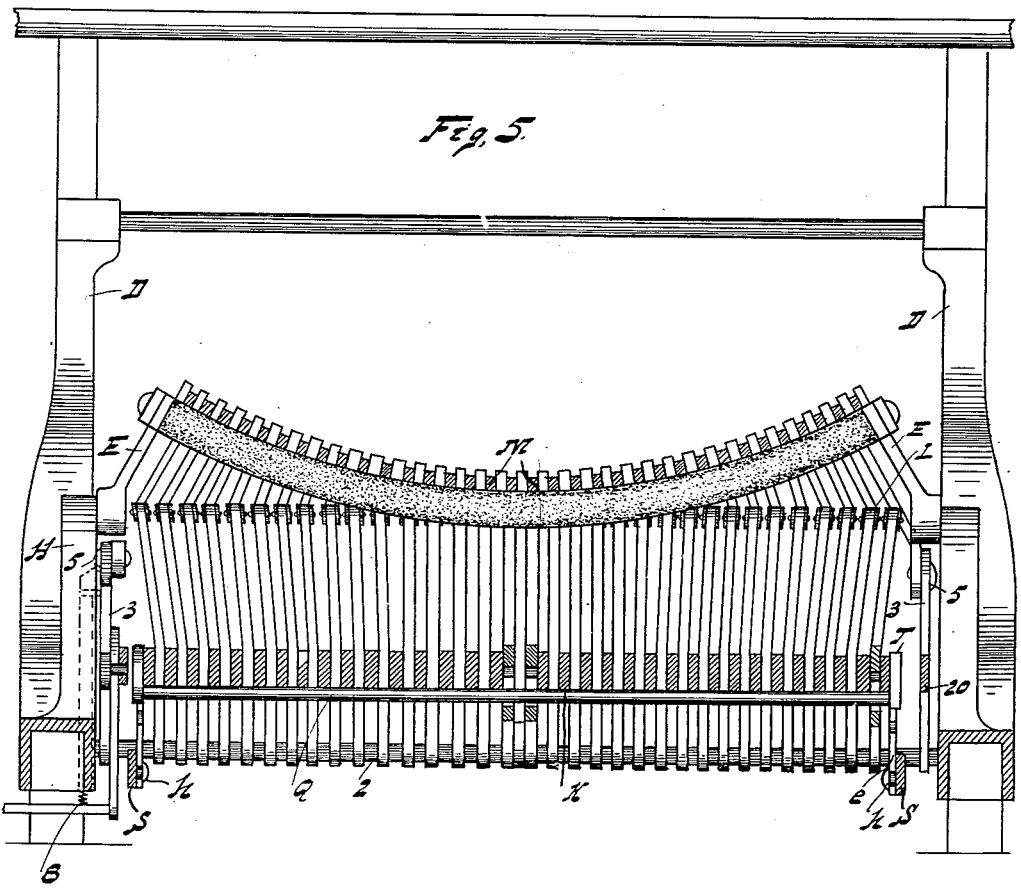
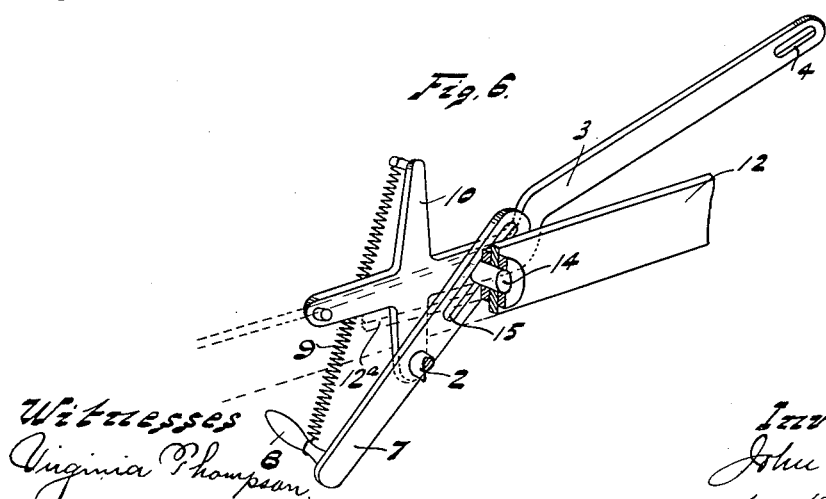

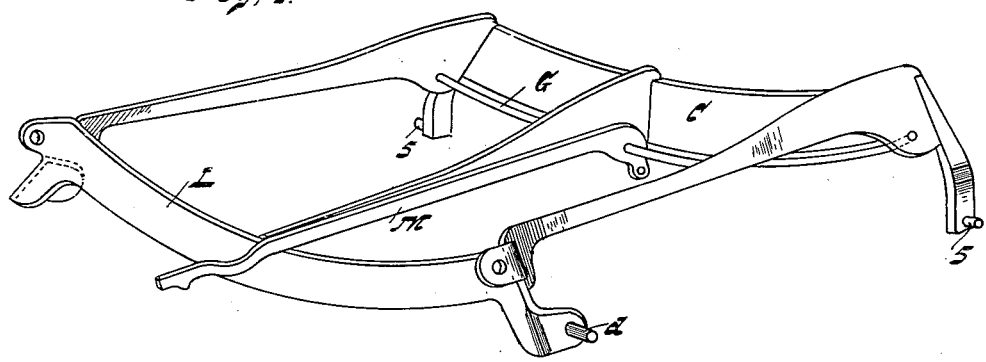
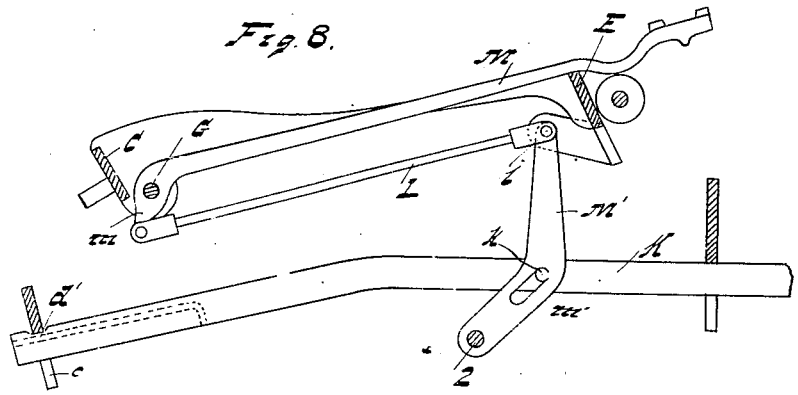

UNITED STATES PATENT OFFICE.

JOHN W. PAUL, OF KITTANNING, PENNSYLVANIA.

TYPE-WRITER.

No. 824,579.  Specification of Letters Patent.  Patented June 26, 1906.

Application filed November 1, 1901. Serial No. 80,738.

*To all whom it may concern:*

Be it known that I, JOHN W. PAUL, a citizen of the United States, residing at Kittanning, in the county of Armstrong and State of Pennsylvania, have invented certain new and useful Improvements in Type-Writers; and I do hereby declare the following to be a full, clear, and exact description of the invention, such as will enable others skilled in the art to which it appertains to make and use the same.

This invention relates to type-writers; and it consists in certain improvements in the construction thereof, as will be hereinafter fully described, and pointed out in the claims.

More particularly, the invention relates to that class of type-writers known as "front-strike" type-writers, and while the invention broadly includes other classes of type-writers the machine shown is of the front-strike type and is so described.

The objects of the invention are to provide a means for carrying the type-bars which may be easily shifted in order to bring into printing position either the upper or lower case characters, also to provide a means for conveniently shifting a type-frame carrying the type-bars for this purpose, also to provide a simple means for conveying the action of the keys to the type-bars, and also to provide details of the construction which will more fully appear in the claims following.

In the accompanying drawings, Figure 1 is a section on the line 1 1 in Fig. 4 looking in the direction indicated by the arrow. Fig. 2 is a sectional view on the line 2 2 in Fig. 4 looking in the direction indicated by the arrow. Fig. 3 is a view similar to Fig. 2, but with the type-bar shifted to the upper position. Fig. 4 is a sectional view on the line 4 4 in Fig. 2. Fig. 5 is a transverse section on the line 5 5 in Fig. 1 looking in the direction indicated by the arrow. Fig. 6 is a detail view of the shifting mechanism. Fig. 7 is a projection of the type frame or basket. Fig. 8 is a view of the type-bar-operating mechanism.

A marks the frame of the machine. Extending upwardly from this frame is a bracket or arm D, carrying the carriage-support. The type-bar frame C is pivoted on the standards H, extending upwardly from the frame A by means of the pivot $d$. The pivot $d$ is located near the front of the type-bar frame and toward the front of the machine. The type-bars M are pivoted on a rod G, which is curved similarly to the segment carrying the type-bar and preferably forms a pivot for all the type-bars. The front ends of the type-bars normally rest upon the buffer E. The rear end of the type-frame C is provided with the extension I. This extension I moves between the stops or buffers J J. These stops are provided with the adjusting-screws $j$ $j$, by means of which the length of the distance between the stops may be accurately adjusted. This distance should be such as to shift the type-bars sufficiently to bring the upper and lower case letters accurately to the printing-line.

The type-bar action is as follows, (see Fig. 8:) Extending forwardly from the ends of the type-bars are the projections $m$. With these are connected by a pivotal joint the links L. The forward end of the link L is connected with the rock-lever M', which is pivoted on a fixed pivot 2, the link L and lever M' forming a flexing connection, the point of flexure being the pivotal connection $i$. The rock-lever M' preferably extends forwardly from the pivot 2 and is provided with a cam $m'$, and the pivots 2 are preferably in a horizontal plane. The key-levers K are loosely held in the vertical slots $c$ in the cross-bar $d'$ and arranged in substantially a horizontal plane. The pins $k$ on the key-levers project through the slots $m'$. The slots $m'$ are so slanted that upon depression of the key-lever K the rock-lever M' is rocked toward the front of the machine and the connections thereby flexed, so as to draw the link L forwardly and the type-bar to the platen. The slant of the slot $m'$ and the arrangement of the projection $m$ with relation to its pivot are such that the type-bar in its excursion starts with a minimum velocity, but with a maximum leverage by means of the key-lever. Its velocity is gradually increased with an equal velocity of the key-lever, thus providing a sensitive touch and rapid action. In the construction shown not only is the type-bar accelerated, but the end of the flexing connection connected with the type-bar is also accelerated, so that there is an acceleration due to the actuating mechanism and a further acceleration due to the disposition of the arm at the end of the type-bar. The pivotal point G of the type-bar is preferably slightly in front of the vertical plane touching the front side of the platen, so that the natural position of the printing-line with reference to the type-bar is slightly above the horizontal plane passing through the axis of the platen, so that the printing-line may be more readily observed by the operator. (See Fig. 3, wherein the position of the platen is indicated at W.) The levers M' are preferably all pivoted on the same rod 2 and are preferably of the same shape and length, so that the axes of the pivot $i$ coincide. It will be understood that the mechanism similar to the one shown in Fig. 8 is provided for each type-bar. It will be noted that the pivots $i$ in their normal position are concentric with the axes of the pivots $d$. By this arrangement the type-frame C can be shifted on the pivot $d$, carrying with it the type-bars and the links L without actuating any other mechanism. By this arrangement but a very small part of the mechanism is shifted, and consequently the shifting mechanism can be very easily operated. The printing-point is in a plane which is tangent to a circle at a point intermediate the uppermost and lowermost pivots of the series of type-bars, the circle being drawn with the pivots $d$ as a center. By so arranging the parts the shift of the type-bars is very nearly in a straight line, so that the face of the type is at substantially the same angle to the face of the platen in either position.

A feed-frame T is provided. It has its inner end free and has a transverse bar Q, which is located just under the key-levers and adapted to be actuated upon the depressing of any key-lever. The rear end of the feed-frame is connected with a dog-frame R, upon which may be arranged any escapement desired.

The spacer-bar S is connected with the feed or universal frame T by means of an extension which extends downwardly near the front end of the universal or feed frame. This extension T' is provided with a slot $e$, in which is arranged the stud $h$. When the universal bar or feed-frame is depressed by a key-lever, the slot permits the movement of the frame on the stud $h$.

I provide a shifting device which is especially adapted to the pivoted type-bar frame, although it may be adapted to any shifting type-bar frame. I have arranged the shifting mechanism so that the type-bar frame may be locked so as to normally bring the capitals or small letters to the printing-line and with a depression of the shift-key will shift the type-bar so as to bring the type not normally in a position to reach the printing-line to the printing-line. This mechanism is particularly shown in Fig. 6. The shift-lever 3 is pivoted on the rod 2. This rod 2 extends from or is fixed within the frame of the machine. At the rear end of the lever 3 is a slot 4, in which is arranged a stud 5 (see Fig. 7) at the inner end of the type-frame. The purpose of the slot 4 is to permit of the pivotal movement of the type-bar frame and the lever 3. Pivoted on the rod 2 is the reverse-lever 7. Arranged in the upper end of this lever is a slot 15, and playing in this slot is a pin 14. The pin 14 is provided with washers which hold it so as to slide in a slot $12^a$ in the shift-key lever 12. The lever 3 is provided with the stops 3', which limit the movement of the reversing-lever 7. Extending upwardly from the shift-lever 3 is an arm 10. The reversing-lever 7 is provided with a handle 8, by which it may be conveniently operated. A spring 9 is tensioned between the upper end of the arm 10 and the lower end of the reversing-lever 7. It can readily be seen that the tension of the spring 9 tends to hold the lever 7 against one of the stops 3' and that as the lever 7 passes by the line connecting the upper end of the arm 10 with the pivot 2 the spring 9 will snap the lever to the stop 3'. It will noted also that the pin 14 when in its rearward position depresses the lever 3 with a depression of the shift-key lever 12. It will also be noted that the spring 9, operating upon the arm 10, throws the lever 3 upwardly, thus holding the type-bar frame normally in its upper position. The depression of the shift-key lever, therefore, throws the type-bar frame to a position opposite its normal position. When the reversing-lever 7 is thrown to a position opposite that shown in Fig. 6, the spring 9 tends to pull the lever 3 downwardly, and thus holds the type-bar frame in its lower position. On the other hand, this reversal of the part has shifted the pin 14 in the slot $12^a$, so that it is in front of the pivot 2, and the upper end of the lever 7, operating upon the stops 3', depresses the front end of the lever 3 and raises the rear end of the lever 3 so as to raise the type-frame. By this mechanism, therefore, the type-frame is shifted by a depression of the shift-key whether the type-frame is normally in a position for either upper or lower case letters and that either the lower or upper case letters may be made the normal position of the type-bar frame.

I have arranged at the right side of the machine opposite the shift mechanism just hereinbefore described, the shift-key lever 20, which operates through a shift-lever upon the stud 5, the shift-lever having a slot 4 for this purpose. It will be noted, however, that this key only shifts the type-bar frame when the type-bar frame is against the lower stop as its normal position.

What I claim as new is—

1. In a type-writer the combination of a shifting type-frame provided with a plurality of type-bars pivoted near their inner ends in the arc of a vertical circle in said type-frame; a shift-key lever; and shifting mechanism arranged to hold the type-frame normally for either upper or lower case and to shift from either position upon the depression of the shift-key lever.

2. In a type-writer, the combination of a rocking type-frame provided with a plurality of type-bars pivoted near their inner ends in an arc lying approximately in a vertical plane; a shift-key lever, and shifting mechanism arranged to hold said rocking frame normally in position for either upper or lower case characters and for shifting from either position to the other upon the depression of the shift-key lever.

3. In a type-writer, the combination of a supporting-frame, a shifting type-frame having its outer ends supported by horizontally-arranged pivotal points whereby its inner end can be vertically shifted, by the swinging of the entire type-bar frame on said pivots a plurality of type-bars pivoted near their inner ends in the arc of a vertical circle, and a plurality of key-levers having their inner ends loosely supported by the said supporting-frame and operative connections having one end connected with the type-bars and their opposite ends operatively connected with the key-levers at points intermediate their ends, substantially as described.

4. In a type-writer the combination of a rocking type-bar frame; means for shifting said frame; a type-bar carried by said frame; a flexing connection having one end connected with the type-bar and the other with a fixed point, the axis of said rocking frame being arranged relatively to a joint of the flexing connection to permit of the movement of the rocking frame without the movement of the means for operating the flexing connection; and means for flexing said connection.

5. The combination of the platen; a rocking frame in a plane below the platen pivoted toward the front of the machine and extending rearwardly and carrying or comprising a segmental type-bar support or type-bar frame arranged to swing with the rocking frame, and a segmental back-stop or buffer for the type-bars; type-bars pivotally mounted and normally extending toward the front of the machine and lying against or upon said back-stop or buffer; keys carried independently of said rocking frame; means for actuating the type-bars on the depression of a key; means for rocking said frame on its pivot for the purpose set forth.

6. In a type-writer the combination of a pivoted type-bar frame; the type-bar carried by said frame; a flexing connection having one end attached to said type-bar and the other to a fixed point, the point of flexure of said connection being concentric to the pivot of the frame; and means for actuating said flexing connection.

7. In a type-writer, the combination of the platen; a type-bar frame arranged below the platen; a pivot for said frame arranged toward the front of the machine; type-bars arranged in said frame in a substantially normally horizontal position; flexing connections for operating said type-bars, one end of each of said connections being attached to said type-bar and the other to a fixed point, the point of flexure being concentric to the pivot of the frame; and means for flexing said connections.

8. A type-writer comprising a supporting-frame, a type-bar frame provided at its outer end with horizontally-arranged pivotal points supported by the supporting-frame, means for shifting the inner free end of the type-frame vertically, a plurality of upwardly-arranged levers pivotally supported by the supporting-frame, connections between the upper free ends of the said levers and the inner ends of the type-bars, and a plurality of key-levers having their inner ends supported in a horizontal plane by the said supporting-frame, and operatively connected with the said upwardly-arranged levers, substantially as described.

9. In a type-writer, the combination of a supporting-frame, a type-frame pivoted at its outer end upon the supporting-frame, a plurality of type-bars pivoted near their inner ends in the arc of a vertical circle in the inner free end of the type-frame, means for moving the inner end of the type-frame vertically, a plurality of upwardly-extending levers located below the type-bars and pivotally supported by the supporting-frame at their lower ends, connections between the upper free ends of the vertically-arranged levers and the inner ends of the type-bars, and a plurality of key-levers having their inner ends loosely supported in a horizontal plane by the supporting-frame, and operative connections situated at points between the ends of the key-levers and the ends of the upwardly-extending levers, substantially as described.

10. A type-writer comprising a supporting-frame, a type-bar frame pivotally supported at its outer end by the supporting-frame and adapted to move vertically at its inner end, a plurality of type-bars pivoted near their inner ends in the arc of a vertical circle in the inner end of said type-frame, a plurality of upwardly-extending levers pivoted at their lower ends in a horizontal plane in said supporting-frame, connections between the upper free ends of the levers and the inner ends of the type-bars, and a plurality of key-levers loosely supported at their inner ends in a horizontal plane by the supporting-frame, and a cam-slot and pin connection between the key-levers and the vertically-arranged levers and located at points intermediate the ends of the said upwardly-extending levers and the key-levers, substantially as described.

11. In a type-writer the combination of a type-frame pivoted at one end, a plurality of type-bars pivoted near their inner ends in the arc of a vertical circle in the opposite end of said type-frame, a plurality of key-levers, plurality of upwardly-extending levers pivoted at their lower ends below the type-bars and independent of the type-frame, connections having one end connected with the inner end of the type-bars and their opposite ends connected with the upper free ends of the said upwardly-extending levers at points concentric with the pivotal points of the said type-frame, substantially as described.

12. In a type-writer, the combination of a type-frame pivoted at its outer end, a plurality of outwardly-extending type-bars pivotally supported near their inner ends in the arc of a vertical circle in the inner end of the said type-frame, and key-lever connections with the type-bars, the said connections hinged at a point concentric with the pivotal point of the type-frame, substantially as described.

13. In a type-writer, the combination of a vertically-shifting type-bar frame; a type-bar carried by said frame and arranged to strike a printing-point on the front face of the platen; a key-lever operatively connected therewith; said platen; a shift-key lever and intermediate connections between said shift-key lever and type-bar frame, adapted to be shifted in respect to the key-lever, whereby a depression of the key-lever will cause either an up or down movement of the type-bar frame according to its normal position; substantially as described.

14. In a type-writer, the combination of a vertically-shifting type-frame, a plurality of type-bars carried thereby, key-levers operatively connected with the type-bars, a pivoted shift-lever having its free end operatively connected with the vertically-movable end of the type-frame, a shift-key lever, and a shifting connection between the shift-key lever and the shift-lever, whereby the point of connection can be moved to opposite sides of the pivotal point of the shift-lever, substantially as and for the purpose described.

15. In a type-writer, the combination of a vertically-shifting type-frame, a plurality of type-bars carried thereby, key-levers operatively connected with the type-bars, a pivoted shift-lever having its free end operatively but movably connected with the type-bar frame, a shift-key lever, and a shifting connection between the shift-key lever and the shift-lever, arranged to shift the connection to opposite sides of the pivotal point of the shift-lever, substantially as and for the purpose described.

16. In a type-writer, the combination of a vertically-shifting type-frame carrying a plurality of type-bars, a plurality of key-levers operatively connected with the type-bars, a pivoted shift-lever having its free end operatively connected with the shifting type-frame, a shift-key lever, a shifting connection between the shift-key lever and the shift-lever and a member for shifting the said connection to opposite sides of the pivotal point of the shift-lever, substantially as described.

17. In a type-writer, the combination of a vertically-shifting type-frame carrying a plurality of type-bars, a plurality of key-levers operatively connected with the type-bars, a pivoted shift-lever having its free end operatively connected with the shifting type-frame, a key-lever carrying a movable connecting means, and reversing-lever engaging the said movable connecting means for carrying it to opposite sides of the pivotal point of the shift-lever, the shift-lever constructed to engage the reversing-lever in its opposite positions, substantially as described.

18. In a type-writer, the combination of a vertically-shifting type-frame carrying a plurality of type-bars, a plurality of key-levers operatively connected therewith, a pivoted shift-lever having its free end operatively connected with the shifting type-frame, a shift-key lever, a pivoted reversing-lever, a shifting connecting means, the reversing-lever having a slot for engaging the shifting connecting means whereby the shifting connecting means can be carried to opposite sides of the pivotal point of the shift-lever, substantially as described.

19. In a type-writer, the combination of a vertically-shifting type-bar frame, a plurality of type-bars carried thereby, a plurality of type-bar keys operatively connected with the type-bars, a pivoted shift-lever having its free end operatively connected with the shifting type-frame, a shift-key lever, a connecting means adapted to be shifted to opposite sides of the pivotal point of the shift-lever and serving to operatively connect the shift-lever and the shift-key lever, and means for holding the shifted connecting means in its opposite positions, substantially as described.

20. In a type-writer, the combination of a vertically-shifting type-frame, a pivoted shift-lever having its free end operatively connected with the said shifting type-frame, a shift-key lever, a shifting connecting means adapted to operatively connect the shift-lever and the shift-key lever, means for shifting the connecting means to opposite sides of the pivotal point of the shift-lever and a spring-controlled means by which the connecting means can be shifted, substantially as described.

21. In a type-writer, the combination of a vertically-shifting type-frame, a pivoted shift-lever having its free end operatively connected with the type-frame, a movable connecting means adapted to be shifted to opposite sides of the pivotal point of the shift-lever, a reversing-lever for moving the said connecting means, and a spring adapted to hold the said reversing-lever in its shifted position, substantially as described.

22. In a type-writer the combination of a vertically-shifting type-bar frame a pivoted shift-lever operatively connected with the said type-bar frame, a shift-key lever, one of said levers provided with a longitudinally-arranged slot, a movable connecting means adapted to be moved in the said slot to opposite sides of the pivotal point of the shift-lever, and means for moving and holding the connecting means in its shifted position, substantially as described.

23. In a type-writer, the combination of a vertically-shifting type-frame, a pivoted shift-lever operatively connected with the type-frame, a key-lever, one of said levers provided with a horizontally-arranged slot, a movable connecting means situated in said slot, and means for moving the connecting means in the slot to opposite sides of the pivotal point of the shift-lever, substantially as described.

24. In a type-writer, the combination of a shifting type-bar frame, a plurality of type-bars carried thereby, a plurality of type-bar key-levers operatively connected with the type-bars, pivoted shift-levers situated respectively at opposite sides of the said type-bar key-levers, a shift-key rigidly connected with the shift-lever situated at one side of the keyboard, and a shift-key lever operatively connected with the shift-lever at the opposite side of the keyboard through the medium of a shifting-fulcrum, substantially as and for the purpose described.

25. In a front-strike type-writing machine, the combination of a pivoted type-bar arranged below the platen, and normally lying toward the front of the machine; a flexing connection disposed below said type-bar, one end being connected with the type-bar and the opposite end secured to a point arranged in front of the type-bar pivot, said opposite end being arranged to swing about said fixed point with a movement entirely pivotal when said connection is flexed; a key; and means actuated by said key and applied to the flexing connection intermediate its ends for flexing it to actuate the type-bar, said means comprising a cam-actuating device for immediately operating the said flexing connection.

26. In a front-strike type-writing machine the combination of a pivoted type-bar arranged below the platen, and normally lying toward the front of the machine; a flexing connection disposed below said type-bar, one end being connected with the type-bar and the opposite end secured to a point arranged in front of the type-bar pivot, said opposite end being arranged to swing about said fixed point with a movement entirely pivotal when said connection is flexed; a key; and means actuated by said key and applied to the flexing connection intermediate its ends for flexing it to actuate the type-bar, said means comprising a cam-actuating device for immediately operating the said flexing connection, the distance between the point of flexure and the type-bar being greater than the distance between the point of flexure and the fixed point.

27. In a front-strike type-writing machine, the combination of a pivoted type-bar arranged below the platen, and normally lying toward the front of the machine; a flexing connection disposed below said type-bar, one end being connected with the type-bar and the opposite end secured to a point arranged in front of the type-bar pivot, said opposite end being arranged to swing about said fixed point with a movement entirely pivotal when said connection is flexed; a key; and means comprising a loose or slot connection with said flexing connection intermediate its ends and arranged to be actuated by said key.

28. In a writing-machine, the combination of a platen; type-bar segment; means for changing the relation between the segment and the platen; type-bars pivoted in the segment and normally lying toward the front of the machine; flexing connections located under the type-bars and connected thereto and also connected to a fixed point; a series of keys; the device actuated by said keys and having sliding, loose or slot connections with said flexing connections intermediate their ends.

29. In a type-writer, the combination of a normally approximately horizontally disposed type-bar M, having the projecting end $m$; the link L connected with said projection; the rock-lever M' pivotally connected with the link L forming with said link a flexing connection and having the slot $m'$ intermediate the ends of said flexing connection; the key-lever K and pin $k$ arranged to operate in the slot $m'$.

30. In a type-writer, the combination of a main frame; a rocking type-bar frame; a type-bar pivoted on said frame; a cylindrically-shaped platen on which said type-bar operates; a flexing connection having one end arranged to operate the type-bar and the other connected with the main frame with a fixed axis, the axis of said rocking frame being arranged relatively to a joint on the flexing connection to permit of the movement of the rocking frame independently of any means for operating the flexible connection and to swing the type-bar pivot in a direction approximating a tangent to the platen; means applied intermediately of the ends of the flexing connection for flexing said connection; and means for shifting said type-bar frame.

In testimony whereof I affix my signature in presence of two witnesses.

JOHN W. PAUL.

Witnesses:
ADELAIDE DUNNE,
MYRTLE D. THOMPSON.